July 30, 1957 R. F. E. STEGEMAN 2,800,695
ATTACHING CLIP FOR SPECTACLE CASES
Filed Aug. 25, 1955

INVENTOR.
R.F.E. STEGEMAN
BY
ATTORNEY

United States Patent Office 2,800,695
Patented July 30, 1957

2,800,695

ATTACHING CLIP FOR SPECTACLE CASES

Raymond F. E. Stegeman, Greece, N. Y., assignor to Bausch & Lomb Optical Company, Rochester, N. Y., a corporation of New York Application August 25, 1955, Serial No. 530,529

1 Claim. (Cl. 24—3)

This invention relates to spectacle cases and more particularly it has reference to an attaching clip which may be releasably secured to the spectacle case.

One of the objects of this invention is to provide a simple yet efficient attaching clip which can be readily secured to or removed from a spectacle case so that when the clip is attached to the case the latter may be detachably held on a relatively thin, flat object such, for example, as the visor in common use in automobiles. Other objects are to provide such an attaching clip which can be made at a minimum of expense and to provide a clip which can be easily secured to a spectacle case. These and other objects and advantages will be apparent in the details of construction, arrangement and combination of parts, as will hereinafter be more fully described and pointed out in the appended claim.

Referring to the drawings.

Figure 1:
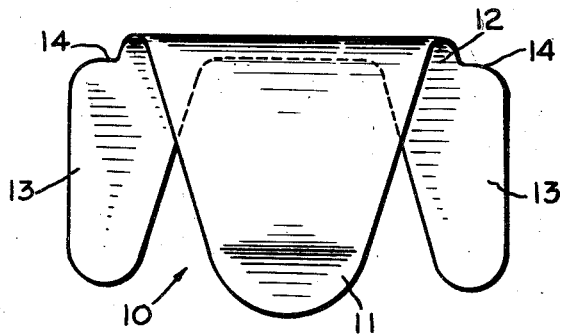
Fig. 1 is a rear elevational view of an attaching clip embodying my invention.
Figure 4:
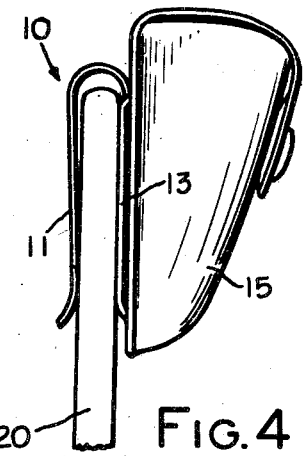
Fig. 4 is an end view showing the attaching clip in use.
Figure 3:
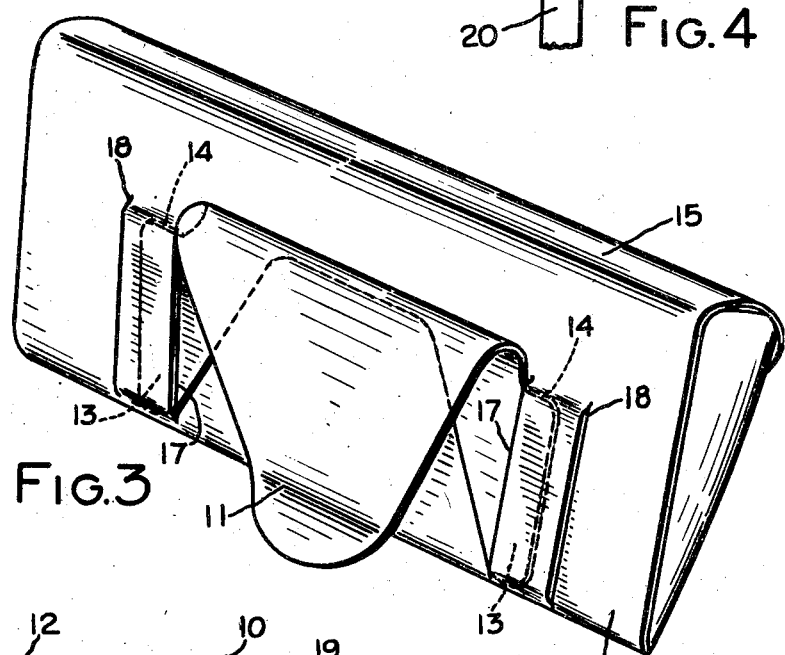
Fig. 3 is an enlarged perspective view showing the attaching clip mounted on a spectacle case.
Figure 2:
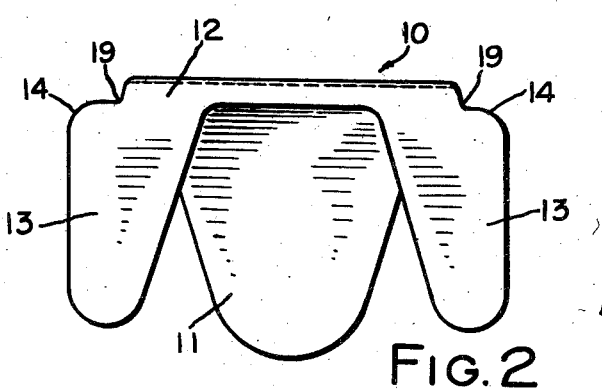
Fig. 2 is a front elevational view thereof.

A preferred embodiment of my invention is disclosed in the drawings wherein 10 indicates, generally, an attaching clip which is formed of a resilient sheet material, such as metal. The member has a substantially U-shape with the rear part 11 and the front part 12. The front part 12 is bifurcated so as to provide the two spaced legs 13, at the top of each of which there is formed an offset shoulder 14.

The spectacle case 15 has a rear side portion 16 in which there are formed, at each end thereof, the vertically spaced, parallel slits 17 and 18. The side 16 of the spectacle case is preferably formed of sheet material, such as leather, plastic or the like. It is customary in the art to provide such pairs of spaced, vertical slits on the rear side of the spectacle case so that the wearer's belt may be threaded through the spaced, parallel slits in order to carry the spectacle case on the belt.

In order to secure the attaching clip 10 to the spectacle case 15, one leg 13 of the clip 10 is inserted in the slit 17. Since the clip is formed of yieldable material and the side 12 is bifurcated, the latter may be sprung or flexed slightly so that the other leg 13 may be forced into the opposite slit 17. The distance from the bottom of each leg 13 to the top shoulder 14 is substantially the same as the vertical height of the slits 17, and the distance between the bases 19 of the shoulders 14 is substantially the same as the distance between the two parallel slits 17. Hence, the clip 10 may be readily attached to or removed from the case 15 by slightly springing or bending the clip so as to permit the legs 13 to be inserted in or removed from the slits 17.

From the foregoing, it will be apparent that I am able to attain the objects of my invention and provide a simple and efficient attaching clip which can be readily attached to or removed from a spectacle case or the like which is provided with a pair of spaced slits on one of its sides. When the clip 10 is attached to the case 15, it is possible to support the case on a relatively flat, broad object such, for example, as the visor 20 which is commonly found inside of an automobile. Since the case 15 is generally used for holding spectacles or sun glasses, the latter thereby may be conveniently stored on the visor of an automobile. Or, the case 15 could be secured to the belt of a wearer by slipping the U-shape clip down over the upper edge of a belt. Various modifications may obviously be made without departing from the spirit of my invention, as pointed out in the appended claim.

I claim:

The combination with a spectacle case having a pair of spaced substantially vertical parallel slits in its rear side of an attaching clip comprising a substantially U-shaped member formed of resilient material and having two spaced parts, one of said parts being bifurcated to provide a pair of spaced legs, an offset shoulder at the top of each leg, the distance from the shoulder to the bottom of each leg being substantially the same as the length of said slits, the distance between the slits being substantially the same as that between the bases of the offset shoulders so that the clip may be releasably secured to the case by inserting the spaced legs in the respectively adjacent slits whereby the case may be detachably secured to a visor or the like by the attaching clip.

References Cited in the file of this patent

UNITED STATES PATENTS

| | | |
|---|---|---|
| 693,383 | Emery | Feb. 18, 1902 |
| 769,791 | Demsky | Sept. 13, 1904 |
| 2,195,068 | Wiley | Mar. 26, 1940 |
| 2,201,387 | Churchill | May 21, 1940 |
| 2,262,340 | Shalko | Nov. 11, 1941 |
| 2,578,237 | Geistweit | Dec. 11, 1951 |